United States Patent [19]

Brock

[11] 4,176,853
[45] Dec. 4, 1979

[54] QUICK DISCONNECT TRAILER HITCH

[76] Inventor: James H. Brock, Rte. No. 2, Box 194, Brigham City, Utah 84302

[21] Appl. No.: 926,792

[22] Filed: Jul. 21, 1978

[51] Int. Cl.$^2$ ............................................. B62D 53/04
[52] U.S. Cl. ................................ 280/423 R; 280/509
[58] Field of Search ............... 280/423 R, 423 B, 504, 280/508, 509, 510, 511, 512, 513, 435, 436, 478 R, 478 A, 478 B; 403/122, 141, 142, 143, 144

[56] References Cited

U.S. PATENT DOCUMENTS

| | | | |
|---|---|---|---|
| 2,874,976 | 2/1959 | Linn | 280/512 |
| 3,650,546 | 3/1972 | Koenig | 280/423 R X |
| 3,796,443 | 3/1974 | Crutchfield | 280/423 R X |
| 3,889,978 | 6/1975 | Kann | 280/423 R |

Primary Examiner—Joseph F. Peters, Jr.
Assistant Examiner—R. Schrecengost
Attorney, Agent, or Firm—Brady, O'Boyle & Gates

[57] ABSTRACT

A quick disconnect trailer hitch for connecting a trailer vehicle to a tractor vehicle wherein a pair of pivotally connected jaws are slidably mounted in a vertically disposed tube connected to the trailer vehicle draw bar. A spring is mounted in the tube for biasing the outer ends of the jaws outwardly therefrom to an open position, the jaws being slidable inwardly of the tube to a closed position wherein the outer ends of the jaws surround a ball hitching element connected to the tractor vehicle, the spring biased jaws being latched in the closed position.

7 Claims, 8 Drawing Figures

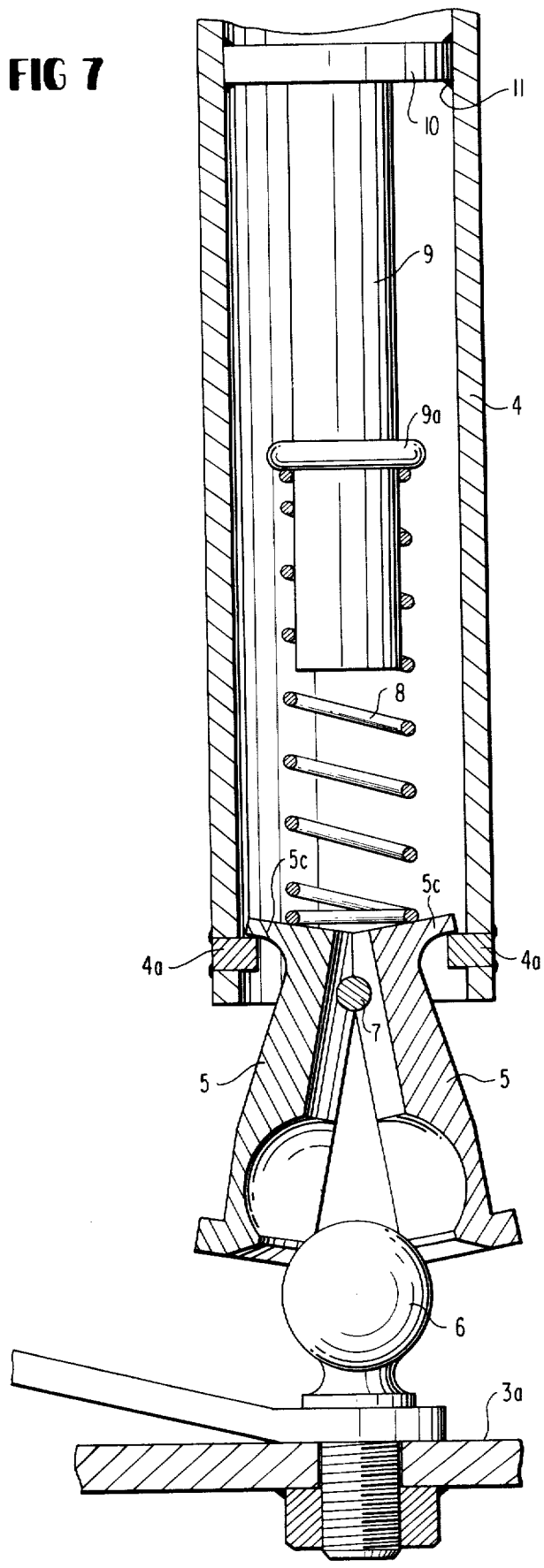
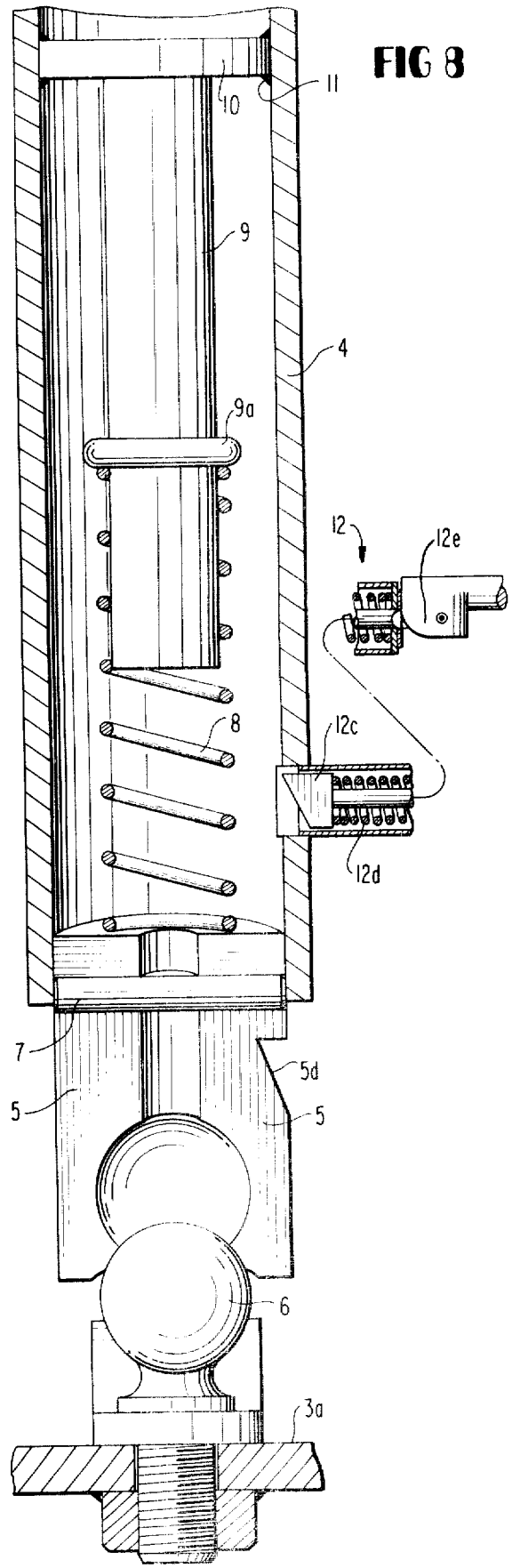

QUICK DISCONNECT TRAILER HITCH

BACKGROUND OF THE INVENTION

Various trailer hitches have been proposed for connecting a "goose neck" type draw bar arranged on a trailer vehicle to a tractor vehicle, such as a pick up truck. Examples of these types of hitches are disclosed in U.S. Pat. Nos. 3,650,546 to Alvin D. Koenig dated Mar. 21, 1972; and U.S. Pat. No. 3,796,443 to J. Warren Crutchfield dated Mar. 12, 1974. These types of hitches are characterized by a sleeve movable over a pair of pivotal jaws to enclose the jaws around the ball hitching element on the pick up truck. While these types of hitches have been satisfactory for their intended purpose, they have required a great deal of manual dexterity and strength to connect and disconnect the trailer hitch.

After considerable research and experimentation, the trailer hitch of the present invention has been devised to overcome the difficulties experienced with conventional trailer hitches employed with "goose neck" draw bars, and comprises, essentially, a pair of pivotally connected jaws slidably mounted in a tube forming a portion of the "goose neck" draw bar. A spring is mounted in the tube for biasing the outer ends of the jaws outwardly therefrom to an open position, the jaws being slidable inwardly of the tube to a closed position wherein the spring is compressed and the jaws surround the conventional ball hitching element on a pick up truck. A latch is provided for holding the jaws in the closed position. By this construction and arrangement, the jaws are essentially cocked when in the closed position and when the latch is released, the biasing force of the spring moves the jaws outwardly of the tube to the released or open position, thereby providing a quick disconnect trailer hitch. Thus, the manual strength of the operator is assisted by the biasing force of the spring to thereby facilitate disconnecting the trailer from the pick up truck.

DESCRIPTION OF THE DRAWINGS

FIG. 7 is a side elevational view, in section, showing the hitch detached from the ball; and FIG. 8 is a side elevational view, in section, showing the hitch detached from the ball, the view being taken 90° from that shown in FIG. 7.

DESCRIPTION OF THE PREFERRED EMBODIMENT

Figure 1:
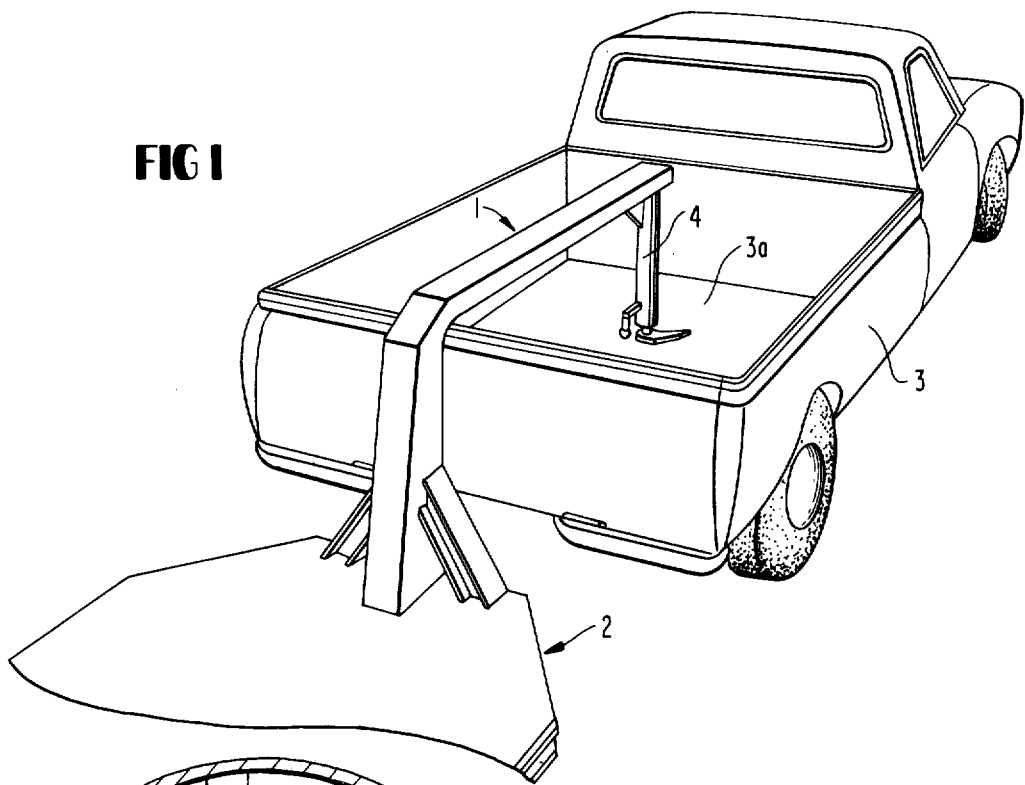
FIG. 1 is a perspective view of the trailer hitch of the present invention connecting a trailer to a pick up truck.
Figure 2:
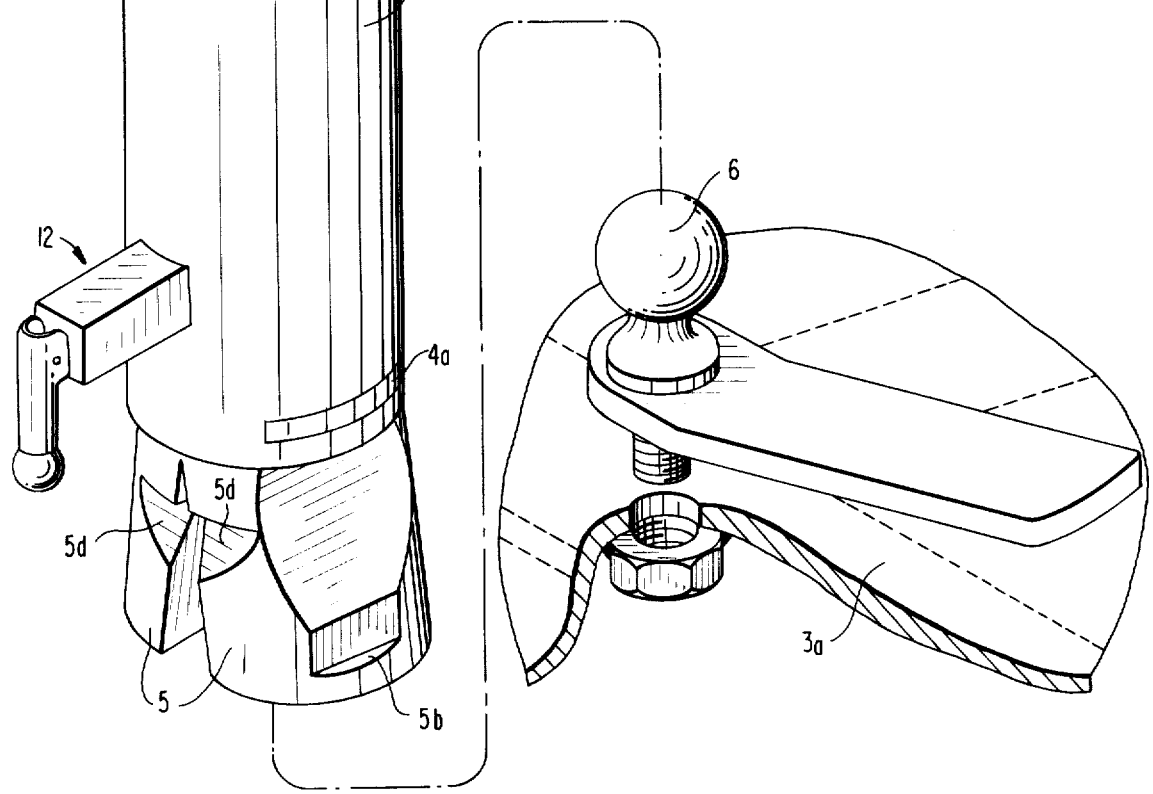
FIG. 2 is an enlarged, fragmentary, perspective view of the hitch disconnected from the ball element.

Referring to the drawings, and more particularly to FIG. 1 thereof, the hitch of the present invention is adapted to be used with a "goose neck" type draw bar 1 wherein one end is rigidly connected to a trailer 2, the draw bar extending over the tailgate of a pick up truck 3 and including a depending tubular portion 4 connectable to the floor 3a of the pick up truck by the hitch of the present invention as shown generally in FIG. 2. The hitch includes a pair of spring biased jaws 5 slidably mounted in the tubular portion 4 of the draw bar, the jaws being connectable to a conventional ball hitching element 6 secured to the floor 3a of the pick up truck.

Figure 3:
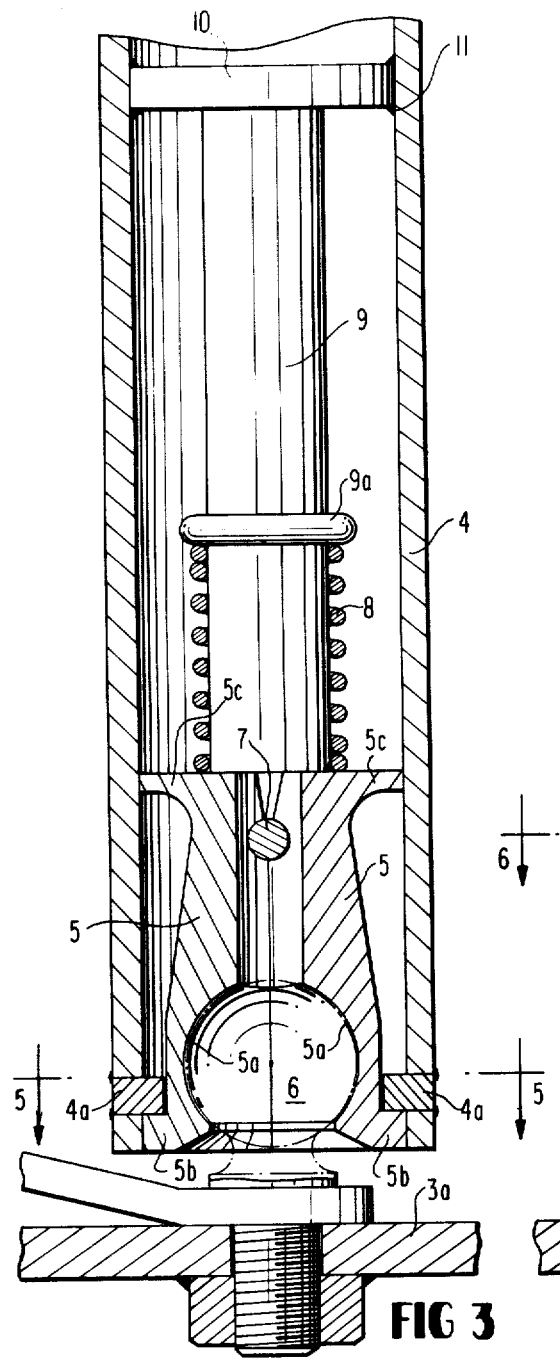
FIG. 3 is a side elevational view, in section, showing the hitch connected to the ball element.
Figure 4:
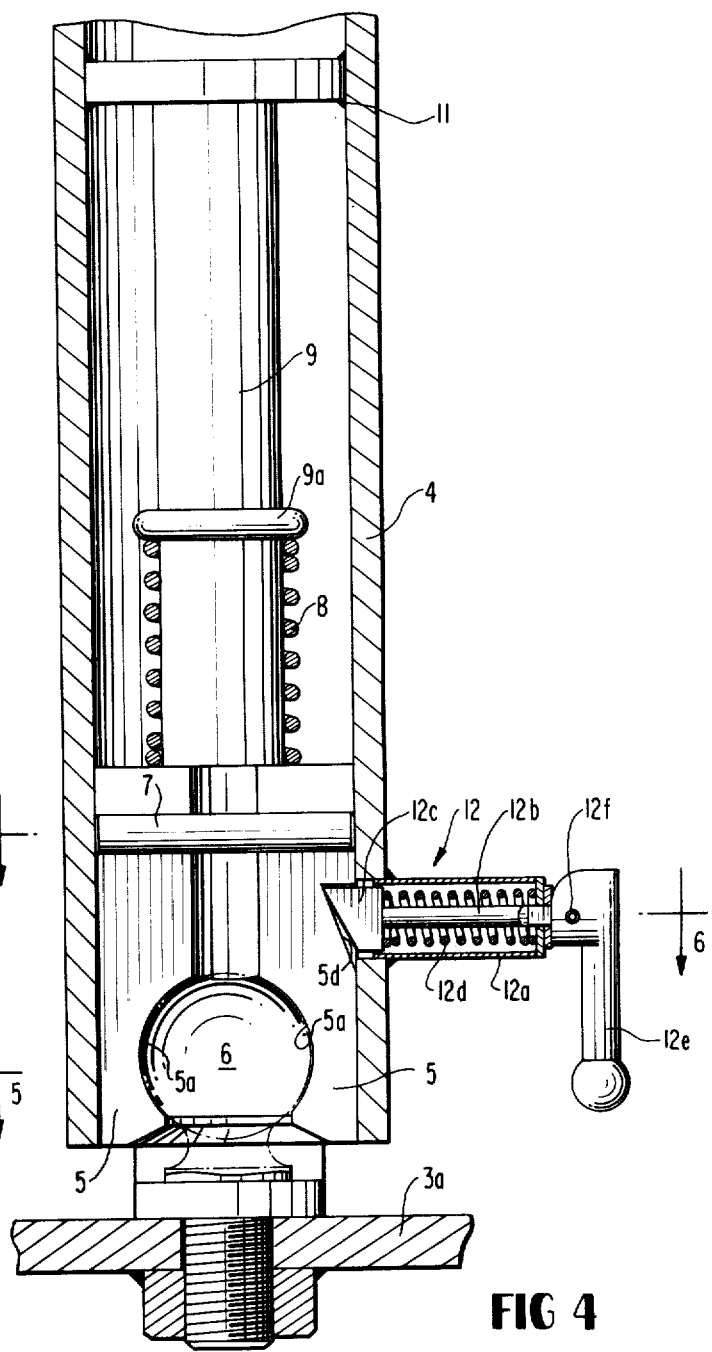
FIG. 4 is a side elevational view, in section, showing the hitch connected to the ball, the view being taken 90° from that shown in FIG. 3.
Figure 5:
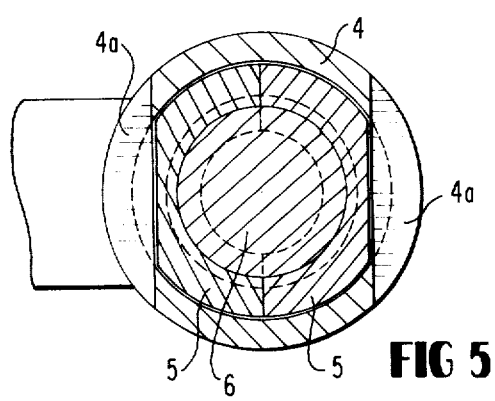
FIG. 5 is a view taken along line 5—5 of FIG. 3.
Figure 6:
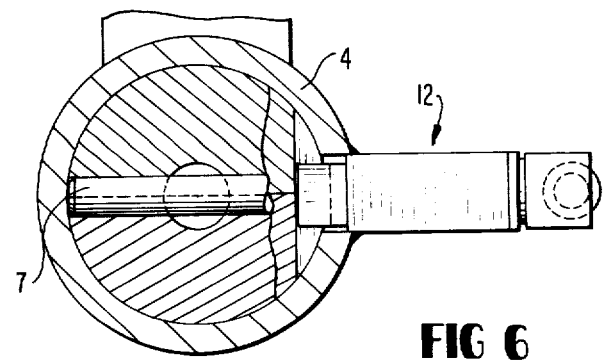
FIG. 6 is a view taken along 6—6 of FIG. 4.

The details of the construction of the hitch of the present invention are shown in FIGS. 3 and 4, wherein it will be seen that the jaws 5 are guided in their movement relative to the tubular portion 4 by a transversely extending pin 7, and include complementary concave surfaces 5a for surrounding the ball hitching element 6. The outer end of each jaw is formed with a flange portion 5b engageable with chordal plates 4a secured to the tubular member 4 to thereby provide a stop to limit the inward movement of the jaws 5 into the tubular portion 4. The inner end 5c of each jaw engages a coil spring 8 mounted coaxially on a rod 9 rigidly mounted within the tube 4 by a piston or disc 10 welded as at 11 to the side wall of the tube. While one end of the spring abuts the flanged inner ends 5c of the jaws, the opposite end of the spring abuts a collar 9a rigidly connected to the rod 9. The spring 8 is compressed when the jaws 5 are moved inwardly of the tube 4, as shown in FIG. 3, thus the spring 8 exerts a biasing force urging the jaws outwardly of the tube. In order to hold the jaws 5 inwardly of the tube 4, against the biasing force of the spring 8, a latch 12 is provided, as shown in FIG. 4. The latch includes a housing 12a secured to the wall of the tubular portion 4. A rod 12b extends through the housing and has a keeper 12c connected to one end thereof engageable with cut-out portions 5d formed in the jaws 5. The rod 12b extends through a coil spring 12d biased between the keeper 12c and the end of the housing 12a, the opposite end of the rod 12b having a cam lever 12e pivotally connected thereto as at 12f.

When it is desired to release the hitch, the operator moves the latch lever 12e to the position shown in FIG. 8 to thereby pull the keeper 12c out of the cut-out portions 5d in the jaws 5. After the jaws 5 have been released by the latch 12, the spring 8 expands to thereby slide the jaws 5 outwardly of the tube, as shown in FIGS. 7 and 8. When the flanged ends 5c of the jaws abut the upper surface of the chordal plates 4a, the jaws 5 are caused to pivot about pin 7 to the open position to thereby disconnect the hitch from the ball element 6.

When connecting the hitch to the ball element 6, the tubular portion 4 of the draw bar is aligned with the ball 6, and the operator pushes the tubular portion 4 downwardly so that the open jaws 5 engage the ball element 6. As the ball 6 engages the jaws 5, the jaws are caused to slide inwardly of the tubular portion 4 until the latch spring 12d forces the keeper 12c into the cut-out portions 5d in the jaws. The jaws 5 are then in the locked position around the ball as shown in FIGS. 3 and 4.

From the above description it will be readily apparent to those skilled in the art that the construction and arrangement of the trailer hitch of the present invention provides a trailer hitch which can be connected into operative position and quickly disconnected therefrom with a minimum effort on the part of the operator.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A trailer hitch comprising, a tubular member connected to a trailer, a pair of jaws, said jaws having complementary concave surfaces adapted to surround a ball hitching element connected to a tractor vehicle, said jaws being slidably mounted in said tubular member, spring means mounted in said tubular housing for biasing the jaws outwardly of the tubular member to a position wherein the jaws are moved to an open position, a pin oriented between the jaws for guiding said jaws during movement relative to said tubular member, and latch means connected to said tubular member for holding the jaws inwardly of the tubular member against the biasing force of said spring means.

2. A trailer hitch according to claim 1, wherein the tubular member comprises a depending tubular portion of a goose neck type draw bar having one end rigidly connected to a trailer.

3. A trailer hitch according to claim 1, wherein the spring means comprises a coil spring having one end abutting the inner ends of the jaws, the other end of the spring engaging abutment means mounted in said tubular member.

4. A trailer hitch according to claim 3, wherein the abutment means comprises a rod positioned coaxially within said tubular member, a piston connected to one end of said rod, said piston being rigidly connected to the inner wall of said tubular member, a collar rigidly connected to said rod, said coil spring being mounted coaxially on said rod, said other end of the spring engaging said collar.

5. A trailer hitch according to claim 1, wherein the latch means comprises a housing secured to the outer wall surface of said tubular member, a rod slidably mounted in said housing, a keeper connected to one end of said rod, cut-out portions formed in said jaws for receiving said keeper, spring means mounted in said housing for biasing said keeper into said jaws, and a cam lever pivotally connected to the other end of said rod, whereby when the lever is pivoted to a position to pull the keeper out of the jaws, the jaws are moved outwardly of the tubular member to an open position.

6. A trailer hitch according to claim 1, wherein stop means are mounted on the end of the tubular member to limit the outward and inward movement of the jaws relative to the tubular member.

7. A trailer hitch according to claim 6, wherein the stop means comprises a pair of chordal plates connected to the end portion of the tubular member, each end of each jaw being provided with a flange portion engageable with said plates.

* * * * *